(12) United States Patent
Brown (10) Patent No.: US 10,333,302 B2
(45) Date of Patent: Jun. 25, 2019

(54) CIRCUITS, DEVICES AND METHODS FOR SELECTING VOLTAGE SOURCES (71) Applicant: SKYWORKS SOLUTIONS, INC., Woburn, MA (US)

(72) Inventor: David Alan Brown, San Jose, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 383 days.

(21) Appl. No.: 14/754,200

(22) Filed: Jun. 29, 2015

(65) Prior Publication Data
US 2015/0380943 A1    Dec. 31, 2015

Related U.S. Application Data (60) Provisional application No. 62/019,027, filed on Jun. 30, 2014.

(51) Int. Cl.
*H02J 1/00* (2006.01)
*H02J 3/00* (2006.01)
*H02J 1/10* (2006.01)
*H02J 9/06* (2006.01)

(52) U.S. Cl.
CPC ............... *H02J 3/005* (2013.01); *H02J 1/10* (2013.01); *H02J 9/061* (2013.01)

(58) Field of Classification Search
CPC .... H02J 1/10; H02J 9/061; H02J 3/005; H02J 4/00
See application file for complete search history.

(56) References Cited

U.S. PATENT DOCUMENTS

| 2007/0268726 | A1* | 11/2007 | Kojori ...................... H02J 1/10 363/65 |
| 2010/0019834 | A1* | 1/2010 | Zerbe ........................ G06F 1/26 327/538 |
| 2010/0158082 | A1* | 6/2010 | Galinski ............ G01D 5/24461 375/216 |
| 2012/0182330 | A1* | 7/2012 | Nagaoka ................ G09G 3/003 345/690 |
| 2013/0257636 | A1* | 10/2013 | Hwang ................... H03M 1/20 341/131 |
| 2014/0103973 | A1* | 4/2014 | Kurd ........................ G06F 1/08 327/156 |

FOREIGN PATENT DOCUMENTS

| EP | 2700958 A1 | 2/2014 |
| KR | 1019990071373 A | 9/1999 |
| KR | 1020100103045 A | 9/2010 |
| WO | 2011061633 A1 | 5/2011 |

OTHER PUBLICATIONS

International Search Report and Written Opinion for PCT/US2015/038358 dated Oct. 20, 2015.

* cited by examiner

*Primary Examiner* — Rexford N Barnie
*Assistant Examiner* — Rasem Mourad
(74) *Attorney, Agent, or Firm* — Chang & Hale LLP (57) ABSTRACT

Circuits, devices, and method for selecting voltage sources. A voltage selection module may include an analog voltage input. The voltage selection module may also include a digital based voltage input. The voltage selection module further include a control component coupled to the analog voltage input and the digital based voltage input, the control component configured to determine whether to use a first voltage received from the analog voltage input or a second voltage received from the digital based voltage input to generate an output voltage.

20 Claims, 8 Drawing Sheets

CIRCUITS, DEVICES AND METHODS FOR SELECTING VOLTAGE SOURCES

CROSS-REFERENCE TO RELATED APPLICATION(S)

This application claims priority to U.S. Provisional Application No. 62/019,027 filed Jun. 30, 2014, entitled CIRCUITS, DEVICES AND METHODS FOR SELECTING VOLTAGE SOURCES. The contents of each of the above-referenced application(s) are hereby expressly incorporated by reference herein in their entireties for all purposes.

BACKGROUND

Field

The present disclosure generally relates voltage regulators and/or voltage selection modules.

Description of the Related Art

A voltage regulator may receive an input voltage and may regulate the input voltage to generate an output voltage. For example, the voltage regulator may maintain a constant output voltage level when the input voltage varies. The voltage regulator may use another voltage to control the regulation of the input voltage. The voltage used to control the regulation of the input voltage may be an analog voltage (e.g., a voltage received form an analog voltage source) or a digital based voltage (e.g., a voltage received from a digital based voltage source).

SUMMARY

In accordance with some implementations, the present disclosure relates to a voltage selection module include an analog voltage input. The voltage selection module also includes a digital based voltage input. The voltage selection module further includes a control component coupled to the analog voltage input and the digital based voltage input, the control component configured to determine whether to use a first voltage received from the analog voltage input or a second voltage received from the digital based voltage input to generate an output voltage.

In some embodiments, the control component is further configured to determine that the first voltage is to be used to generate the output voltage.

In some embodiments, the control component is configured to determine that the first voltage is to be used to generate the output voltage by receiving a first input indicating that the first voltage is to be used.

In some embodiments, the control component is further configured to determine that the first voltage is to be used to generate the output voltage by determining that the first voltage is greater than a threshold voltage.

In some embodiments, the control component is further configured to determine that the first voltage is to be used to generate the output voltage by receiving a second input indicating that the second voltage is not to be used.

In some embodiments, the control component is further configured to generate the output voltage based on the first voltage.

In some embodiments, the control component is further configured to determine that the second voltage is to be used to generate the output voltage.

In some embodiments, the control component is configured to determine that the second voltage is to be used to generate the output voltage by receiving a first input indicating that the second voltage is to be used.

In some embodiments, the control component is configured to determine that the second voltage is to be used to generate the output voltage by determining that the first voltage is less than a threshold voltage.

In some embodiments, the control component is further configured to generate the output voltage based on the second voltage.

In some embodiments, the control component includes a comparator coupled to the analog voltage input.

In some embodiments, the control component further includes a multiplexer (MUX) coupled to the comparator.

In some embodiments, the MUX is further coupled to the analog voltage input and the digital based voltage input.

In some embodiments, the MUX is further coupled to a digital based voltage component.

In accordance with some implementations, the present disclosure relates to an electronic device including a voltage regulator. The electronic device also includes a voltage selection module coupled to the voltage regulator, the voltage selection module including an analog voltage input, a digital based voltage input, and, a control component coupled to the analog voltage input and the digital based voltage input, the control component configured to determine whether to use a first voltage received from the analog voltage input or a second voltage received from the digital based voltage input to generate an output voltage.

In some embodiments, the control component is further configured to determine that the first voltage is to be used to generate the output voltage.

In some embodiments, the control component is configured to determine that the first voltage is to be used to generate the output voltage by receiving a first input indicating that the first voltage is to be used.

In some embodiments, the control component is further configured to determine that the first voltage is to be used to generate the output voltage by determining that the first voltage is greater than a threshold voltage.

In some embodiments, the control component is further configured to determine that the first voltage is to be used to generate the output voltage by receiving a second input indicating that the second voltage is not to be used.

In some embodiments, the control component is further configured to generate the output voltage based on the first voltage.

In some embodiments, the control component is further configured to determine that the second voltage is to be used to generate the output voltage.

In some embodiments, the control component is configured to determine that the second voltage is to be used to generate the output voltage by receiving a first input indicating that the second voltage is to be used.

In some embodiments, the control component is configured to determine that the second voltage is to be used to generate the output voltage by determining that the first voltage is less than a threshold voltage.

In some embodiments, the control component is further configured to generate the output voltage based on the second voltage.

In some embodiments, the control component includes a comparator coupled to the analog voltage input.

In some embodiments, the control component further includes a multiplexer (MUX) coupled to the comparator.

In some embodiments, the MUX is further coupled to the analog voltage input and the digital based voltage input.

In some embodiments, the MUX is further coupled to a digital based voltage component.

In accordance with some implementations, the present disclosure relates to a method for selecting a voltage. The method includes determining whether to use a first voltage received from an analog voltage input or a second voltage received from a digital based voltage input to generate an output voltage. The method also includes generating the output voltage based on the first voltage in response to a first determination that the first voltage is to be used. The method further includes generating the output voltage based on the second voltage in response to a second determination that the second voltage is to be used.

In some embodiments, the first determination is based on a first input indicating that the first voltage is to be used.

In some embodiments, the first determination is further based on a third determination that the first voltage is greater than a threshold voltage.

In some embodiments, the first determination is further based on a second input indicating that the second voltage is not to be used.

In some embodiments, the second determination is based on a first input indicating that the second voltage is to be used.

In some embodiments, the second determination is based on a third determination that the first voltage is less than a threshold voltage.

DETAILED DESCRIPTION OF SOME EMBODIMENTS

The headings provided herein, if any, are for convenience only and do not necessarily affect the scope or meaning of the claimed invention.

Disclosed are non-limiting examples of systems, devices, circuits and/or methods related to techniques for selecting an input voltage form one or more voltage sources. Such techniques may be implemented in, for example, voltage regulators. Such techniques may also be implemented in conjunction with, for example, voltage regulators. Although the present disclosure may be described in the context of voltage regulators, it will be understood that one or more features of the present disclosure may also be utilized in other applications.

Described herein are examples of how to operate a voltage selection module and/or a voltage regulator. In one embodiment, the voltage selection module may determine whether the voltage regulator should use the analog voltage or the digital based voltage to control the regulation of the input voltage. The voltage selection module may receive an indication that the voltage regulator should use the digital based voltage. The voltage selection module may also determine whether the analog voltage is greater than or equal to a threshold voltage. The voltage selection module may determine whether the voltage regulator should use the analog voltage or the digital based voltage based on the indication and/or the determination.

Figure 1A:
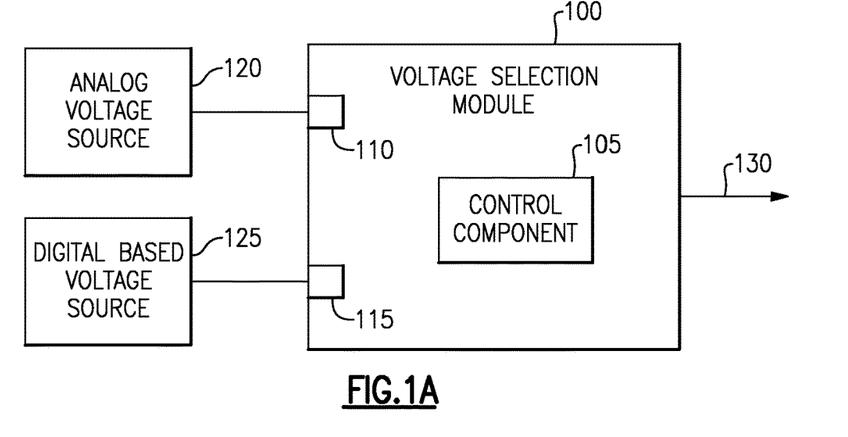
FIG. 1A is a block diagram illustrating a voltage selection module, according to one embodiment of the present disclosure.

FIG. 1A is a block diagram illustrating a voltage selection module 100 according to one embodiment of the present disclosure. The voltage selection module 100 includes a first voltage input 110, a second voltage input 115, a control component 105, and an output 130. The first voltage input 110 may be referred to as an analog voltage input and the second voltage input 115 may be referred to as a digital based voltage input. In one embodiment, the voltage selection module 100 may also be coupled to one or electronic components that may use a voltage received from the one or more voltage sources (as discussed in more detail below). In one embodiment, the voltage selection module 100 may be included as part of an electronic component. For example, the voltage selection module 100 may be part of a voltage regulator (as discussed in more detail below). In another embodiment, the voltage selection module may be separate from an electronic component. For example, the voltage selection module 100 may be separate from a voltage regulator and the output 130 of the voltage selection module 100 may be coupled to the voltage regulator.

As illustrated in FIG. 1A, the voltage selection module 100 is coupled to an analog voltage source 120 via the first voltage input 110. An analog voltage source 120 may be a combination of components, modules, circuits, etc., that may generate a voltage based on a continuous signal or voltage. The voltage selection module 100 is also coupled to a digital based voltage source 125 via the second voltage input 115. A digital based voltage source may be a combination of components, modules, circuits, etc., that generates a voltage based on digital data and/or bits. The voltage selection module 100 may receive an analog voltage from the analog voltage source 120 and may receive a digital based voltage from the digital based voltage source 125. In one embodiment, the control component 105 may provide the digital based voltage to the output 130 when the control component 105 receives an indication that the digital based voltage from the digital based voltage source 125 should be provided to the output 130. For example, the control component 105 may receive a signal, a message, bits of data, etc., from a digital based voltage component indicating that the digital based voltage should be provided to the output 130 (as discussed in more detail below). In another embodiment, the control component 105 may provide the digital based voltage to the output 130 when the control component 105 does not receive an indication that the digital based voltage from the digital based voltage source 125 should be provided to the output 130 and the analog voltage (received from the analog voltage source 120) is less than the threshold voltage. In a further embodiment, the control component 105 may provide the analog voltage to the output 130 when the control component 105 does not receive an indication that the digital based voltage from the digital based voltage source 125 should be provided to the output 130 and the analog voltage (received from the analog voltage source 120) is greater than or equal to a threshold voltage.

As discussed above, the voltage selection module 100 may select and/or determine whether the analog voltage or the digital based voltage should be provided to the output 130. In one embodiment, the voltage selection module may be able automatically determine whether to provide the analog voltage or the digital based voltage to the output 130. Because the voltage selection module 100 may select and/or determine whether to use the analog voltage or the digital based voltage based on an indication (e.g., a signal, a message, bits of data, etc.) to use the digital based voltage and/or based on a threshold voltage, the voltage selection module 100 may not need to be reprogrammed or reconfigured manually to switch between providing the analog voltage and the digital based voltage. The voltage selection module 100 may automatically select the analog voltage or the digital based voltage (based on the indication and/or the threshold voltage) without reprogramming or reconfiguring the voltage selection module (or the voltage regulator if the voltage selection module 100 is included in the voltage regulator). This may allow the voltage selection module 100 (or the voltage regulator if the voltage selection module 100 is included in the voltage regulator) to switch between voltage sources (e.g., between the analog voltage source 120 and the digital based voltage source 125) if one of the voltage sources is not able to provide a voltage (e.g., the voltage source fails). This may also allow the same voltage selection module 100 (or the voltage regulator if the voltage selection module 100 is included in the voltage regulator) to be used in electronic devices (e.g., cellular phone, smart phone, tablet computer, etc.) that use different voltage sources.

Figure 1B:
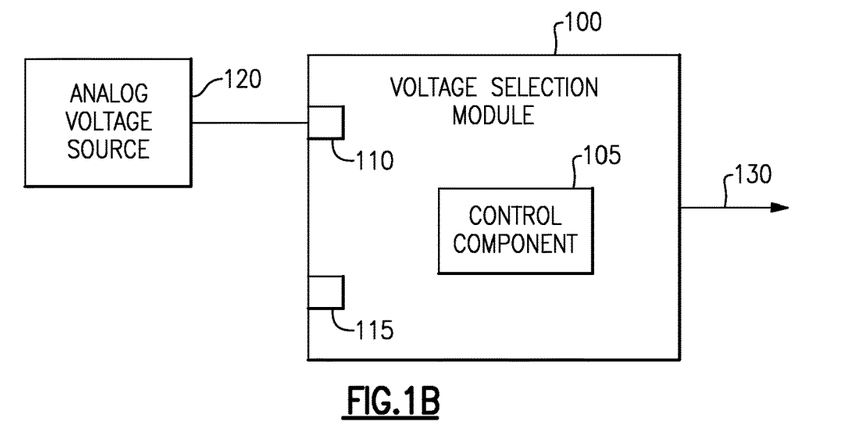
FIG. 1B is a block diagram illustrating a voltage selection module, according to one embodiment of the present disclosure.

FIG. 1B is a block diagram illustrating a voltage selection module 100 according to another embodiment of the present disclosure. The voltage selection module 100 includes a first voltage input 110, a second voltage input 115, a control component 105, and an output 130. The first voltage input 110 may be referred to as an analog voltage input and the second voltage input 115 may be referred to as a digital based voltage input. In one embodiment, the voltage selection module 100 may also be coupled to one or electronic components that may use a voltage received from the one or more voltage sources (as discussed in more detail below). As discussed above, the voltage selection module 100 may be included as part of an electronic component (e.g., a voltage regulator) or may be separate from the electronic component.

As illustrated in FIG. 1B, the voltage selection module 100 is coupled to an analog voltage source 120 via the first voltage input 110. The voltage selection module 100 may receive an analog voltage from the analog voltage source 120. In one embodiment, the control component 105 may provide the analog voltage to the output 130 when the control component 105 does not receive an indication that the digital based voltage from the digital based voltage source 125 should be provided to the output 130 and the analog voltage (received from the analog voltage source 120) is greater than or equal to a threshold voltage.

Figure 1C:
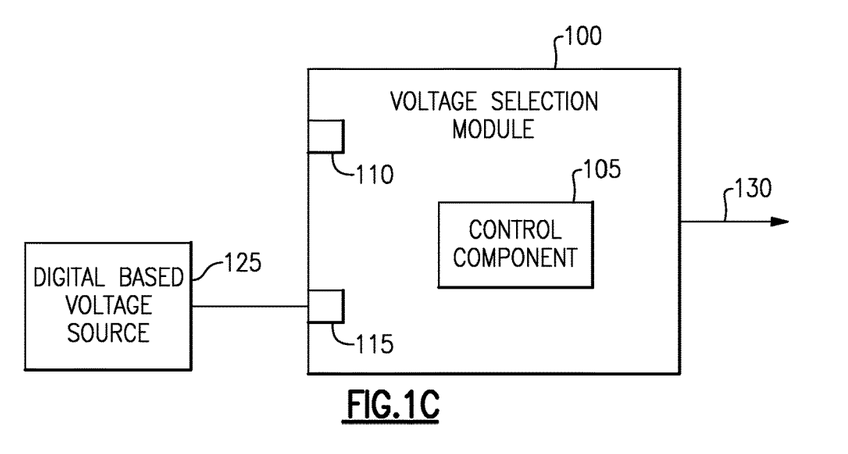
FIG. 1C is a block diagram illustrating a voltage selection module, according to one embodiment of the present disclosure.

FIG. 1C is a block diagram illustrating a voltage selection module 100 according to a further embodiment of the present disclosure. The voltage selection module 100 includes a first voltage input 110, a second voltage input 115, a control component 105, and an output 130. The first voltage input 110 may be referred to as an analog voltage input and the second voltage input 115 may be referred to as a digital based voltage input. In one embodiment, the voltage selection module 100 may also be coupled to one or electronic components that may use a voltage received from the one or more voltage sources (as discussed in more detail below). As discussed above, the voltage selection module 100 may be included as part of an electronic component (e.g., a voltage regulator) or may be separate from the electronic component.

As illustrated in FIG. 1C, the voltage selection module 100 is also coupled to a digital based voltage source 125 via the second voltage input 115. The voltage selection module 100 may receive a digital based voltage from the digital based voltage source 125. In one embodiment, the control component 105 may provide the digital based voltage to the output 130 when the control component 105 receives an indication that the digital based voltage from the digital based voltage source 125 should be provided to the output 130. For example, the control component 105 may receive a signal, a message, bits of data, etc., from a digital based voltage component indicating that the digital based voltage should be provided to the output 130 (as discussed in more detail below). In another embodiment, the control component 105 may provide the digital based voltage to the output 130 when the control component 105 does not receive an indication that the digital based voltage from the digital based voltage source 125 should be provided to the output 130 and the analog voltage (received from the analog voltage source 120) is less than the threshold voltage.

Figure 2:
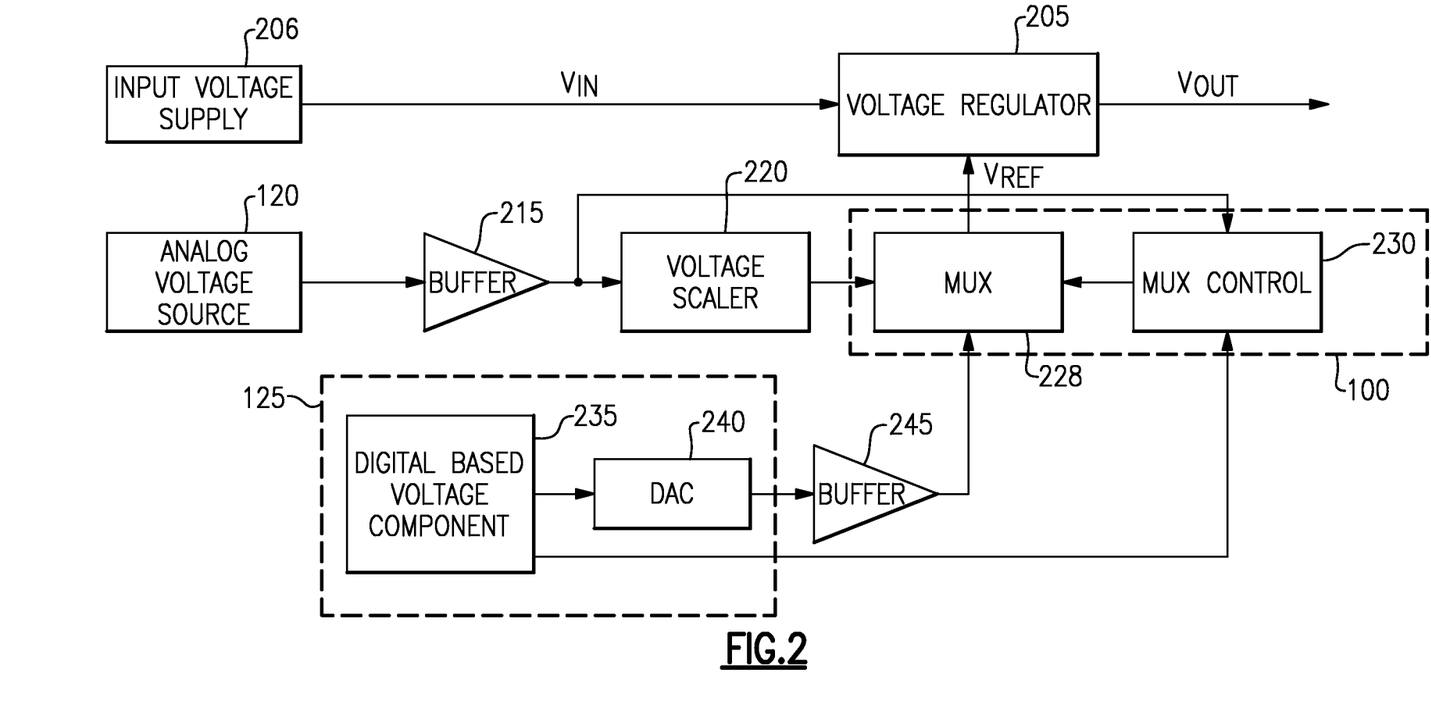
FIG. 2 is a block diagram illustrating an example voltage selection module, according to one embodiment of the present disclosure.

FIG. 2 is a block diagram illustrating an example voltage selection module 100 according to one embodiment of the present disclosure. The voltage selection module 100 includes a multiplexer (MUX) 228 and a MUX control 230. The MUX control 230 may be coupled to the MUX 228. The voltage selection module 100 may be coupled to a voltage regulator 205.

In one embodiment, the voltage regulator 205 may be a component that may maintain a constant output voltage level. The voltage regulator 205 may be used to regulate one or more alternating current (AC) and/or direct current (DC) voltages to generate an output voltage. For example, the input voltage supply 206 may provide an input voltage VIN to the voltage selection module 100 and the voltage regulator 205 may generate an output voltage VOUT using the input voltage from the input voltage supply 206. In one embodiment, the voltage regulator 205 may regulate the input voltage VIN received from the input voltage supply 206 to generate the output voltage VOUT. For example, the voltage regulator 205 may regulate the input voltage VIN provided by the input voltage supply 206 by generating a fixed output voltage VOUT that may remain constant regardless of changes to the input voltage and/or load conditions of the voltage regulator 205. The fixed output voltage VOUT of the voltage regulator 205 may also be referred to as a target voltage or a regulated voltage. The output voltage VOUT may be provided to other components, circuits, devices, etc., via an output of the voltage regulator 205. For example, the output of the voltage regulator 205 may be coupled to a power amplifier (PA) and the voltage regulator 205 may provide the output voltage to the PA. A voltage regulator 205 may also be referred to as a switching regulator. Examples of voltage regulators may include, but are not limited to, a buck regulator, a boost regulator, a buck-boost regulator, etc.

In one embodiment, the voltage regulator 205 may use another voltage to control the regulation of the input voltage VIN. For example, the voltage regulator 205 may use the analog voltage (received from the analog voltage source 120) to control the regulation of the input voltage VIN. In another example, the voltage regulator 205 may use the digital based voltage (received from the digital based voltage source 125) to control the regulation of the input voltage VIN. As discussed above, the voltage selection module 100 may receive one or more voltages from one or more of an analog voltage source 120 and a digital based voltage source 125. In one embodiment, the voltage selection module 100 may determine whether to provide the analog voltage or the digital based voltage to the voltage regulator 205. The voltage regulator 205 may use the voltage received from the voltage selection module 100 to control the regulation of the input voltage VIN.

As illustrated in FIG. 2, the voltage selection module 100 includes a MUX 228. The MUX 228 may be coupled to a voltage scaler 220 which is coupled to a buffer 215. The buffer 215 may be coupled to the analog voltage source 120. The analog voltage source may provide an analog voltage to the buffer 215. The buffer 215 may provide electrical impedance transformation. For example, the buffer 215 may transfer the analog voltage from the analog voltage source 120, having a first impedance level, to the voltage scaler 220, having a second impedance level. In one embodiment, the buffer 215 may be optional. In other embodiments, the buffer 215 may be any component, circuit, module, etc., that provides electrical impedance transformation. The voltage scaler 220 may scale (e.g., modify or change) the analog voltage before providing the analog voltage to the MUX 228 and to the MUX control 230. For example, the voltage scaler 220 may increase the analog voltage or decrease the analog voltage by a factor (e.g., a scaling factor). In one embodiment, the voltage scaler 220 may be optional.

The MUX 228 of the voltage selection module 100 may also be coupled to a buffer 245 which is coupled the digital based voltage source 125. The digital based voltage source 125 includes a digital based voltage component 235 and a digital-to-analog converter (DAC) 240. The DAC 240 may be coupled to the digital based voltage component 235. The digital based voltage component 235 may provide a digital signal (e.g., binary data, digital data, one or more bits, etc.) to the DAC 240. The DAC 240 may generate the digital based voltage based on the digital signal received from the digital based voltage source 125. The DAC 240 may provide the digital based voltage to the buffer 245. The buffer 245 may provide electrical impedance transformation and may provide the digital based voltage to the MUX 228. In one embodiment, the digital based voltage component 235 may be one or more of a component, a circuit, a module, etc., that may signals, messages, data, etc., that may be used to generate a voltage.

As illustrated in FIG. 2, the voltage selection module 100 also includes a MUX control 230. The MUX control 230 may be an example of a control component (e.g., control component 105 illustrated in FIGS. 1A, 1B, and 1C). A control component may be one or more of a component, a circuit, a module, etc., that may determine whether a first voltage (e.g., an analog voltage) or a second voltage (e.g., a digital based voltage) should be used to by the voltage regulator 205. The MUX control 230 is coupled to the output of the buffer 245 and to the digital based voltage component 234. In one embodiment, the MUX control 230 may determine whether the MUX 228 should provide the digital based voltage or the analog voltage to the voltage regulator 205. For example, the MUX control 230 may receive may receive an indication (e.g., a signal, a message, bits of data, etc.) from the digital based voltage component 235 indicating that the MUX 228 should provide the digital based voltage to the voltage regulator 205. The MUX control 230 may provide a signal, a message, bits of data, etc., to the MUX 228 indicating that the digital based voltage is to be used and the MUX 228 may provide the digital based voltage to the voltage regulator based on the signal, message, bits of data, etc. In another example, the MUX control 230 may not receive an indication from the digital based voltage component 235 indicating that the MUX 228 should provide the digital based voltage to the voltage regulator 205. The MUX control 230 may determine whether the analog voltage received from analog voltage source 120 is greater than or equal to a threshold voltage. If the analog voltage is less than the threshold voltage, the MUX control 230 may provide a signal, a message, bits of data, etc., to the MUX 228 indicating that the digital based voltage is to be used and the MUX 228 may provide the digital based voltage to the voltage regulator based on the signal, message, bits of data, etc. If the analog voltage is greater than or equal to the threshold voltage, the MUX control 230 may provide a signal, a message, bits of data, etc., to the MUX 228 indicating that the analog voltage is to be used and the MUX 228 may provide the analog voltage to the voltage regulator based on the signal, message, bits of data, etc.

Figures 3, 4:
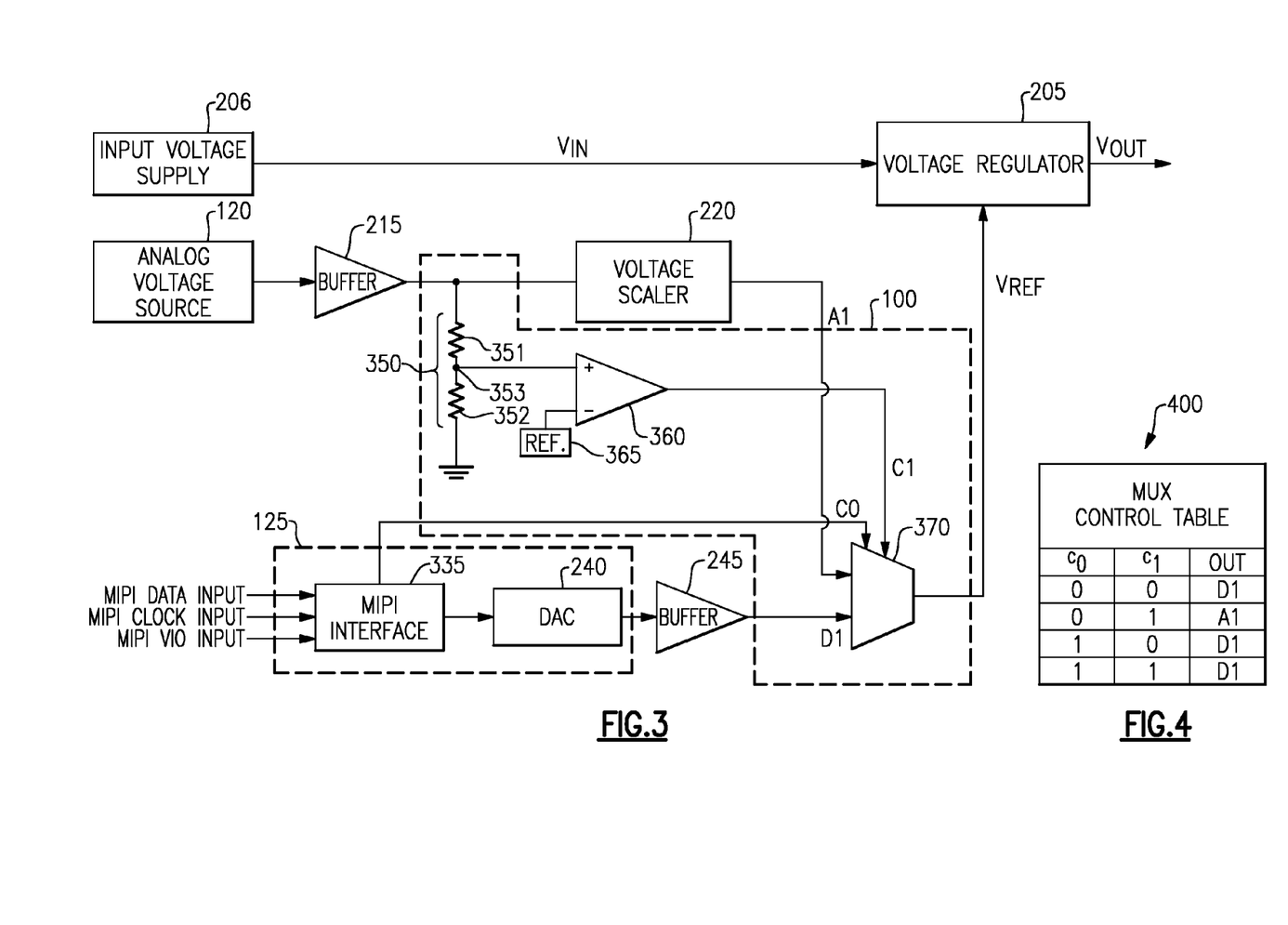
FIG. 3 is a block diagram illustrating an example voltage selection module, according to one embodiment of the present disclosure.
FIG. 4 is a diagram illustrating an example table, according to one embodiment of the present disclosure.

FIG. 3 is a block diagram illustrating an example voltage selection module 100 according to another embodiment of the present disclosure. The voltage selection module 100 a resistive divider 350, a comparator 360, a reference component 365, and a MUX 370. The voltage selection module 100 may be coupled to a voltage regulator 205.

A discussed above, the voltage regulator 205 may be used to regulate one or input voltages (e.g., VIN) to generate a constant output voltage (e.g., VOUT) regardless of changes to the input voltage and/or load conditions of the voltage regulator 205. The output voltage VOUT may be provided to other components, circuits, devices, etc., via an output of the voltage regulator 205. In one embodiment, the voltage regulator 205 may use another voltage to control the regulation of the input voltage VIN. As discussed above, the voltage selection module 100 may receive one or more voltages from one or more of an analog voltage source 120 and a digital based voltage source 125. The voltage selection module 100 may determine whether to provide the analog voltage A1 or the digital based voltage D1 as the reference voltage VREF to the voltage regulator 205. The voltage regulator 205 may use the reference voltage VREF received from the voltage selection module 100 to control the regulation of the input voltage.

As illustrated in FIG. 3, the voltage selection module 100 includes a MUX 370. The MUX 370 may be coupled to a voltage scaler 220 which is coupled to a buffer 215. The buffer 215 may be coupled to the analog voltage source 120. The analog voltage source may provide an analog voltage to the buffer 215. The buffer 215 may provide electrical impedance transformation. In other embodiments, the buffer 215 may be any component, circuit, module, etc., that provides electrical impedance transformation. The voltage scaler 220 may scale (e.g., modify or change) the analog voltage before providing the analog voltage A1 to the MUX 370 and to the MUX 370. In one embodiment, the voltage scaler 220 may be optional.

The MUX 370 of the voltage selection module 100 may also be coupled to a buffer 245 which is coupled the digital based voltage source 125. The digital based voltage source 125 includes a Mobile Industry Processor Interface (MIPI interface) 335 and a digital-to-analog converter (DAC) 240. The DAC 240 may be coupled to the MIPI interface 335. In one embodiment, the MIPI interface 335 may be a MIPI Radio Frequency Front End (RFFE) digital interface. The MIPI interface 335 may be an example of a digital based voltage component. Although a MIPI interface is illustrated in FIG. 3, other embodiments may use other digital interfaces, standards and/or protocols. The MIPI interface 335 may provide a digital signal (e.g., binary data, digital data, bits of data, etc.) to the DAC 240. The DAC 240 may generate the digital based voltage based on the digital signal received from the digital based voltage source 125. The DAC 240 may provide the digital based voltage to the buffer 245. The buffer 245 may provide electrical impedance transformation and may provide the digital based voltage D1 to the MUX 370.

As illustrated in FIG. 2, the MUX 370 is also coupled to a comparator 360. The comparator 360 may be an example of a sensing component. In other embodiments, a sensing component may be any combination of devices, circuits, modules, components, etc., that may be used to compare two or more voltages (e.g., a first voltage and a second voltage). The comparator 360 is coupled to a reference component 365 and a resistive divider 350. The resistive divider 350 may include a first resistance 351 (e.g., a resistor or any component, device, circuit, etc., that may implement electrical resistance) and a second resistance 352 (e.g., a resistor or any component, device, circuit, etc., that may implement electrical resistance) connected in series through node 353. The second resistance 352 may be coupled to a ground so as to form a resistor divider circuit. The first and second resistance values (of the first resistance 351 and the second resistance 352, respectively) may or may not be the same. Configured in such an example manner, the analog voltage may be divided down by the resistive divider 350 to produce a proportionally smaller voltage at node 353. The reference component 365 may generate a threshold voltage and may provide the threshold voltage to the comparator 360. The comparator 360 may compare the analog voltage received from the analog voltage source 120 with the threshold voltage received from the reference component 365. When the analog voltage is less than the threshold voltage, the comparator 360 may produce a signal C1 having a logic low state (e.g., a "0"). When analog voltage is greater than or equal to the threshold voltage, the comparator 360 may produce a signal C1 having a logic low state (e.g., a "1").

As illustrated in FIG. 3, the MUX 370 is further coupled to the MIPI interface 335. The MIPI interface 335 may provide a signal C0 to indicate whether the digital based voltage provided by the digital based voltage source 125 should be provided to the voltage regulator 205. In other embodiments, the MIPI interface 335 may provide other types of indications (e.g., a message, bits of data, a voltage, etc.) to indicate whether the digital based voltage provided by the digital based voltage source 125 should be provided to the voltage regulator 205.

In one embodiment, the MUX 370 may determine whether the MUX 370 should provide the digital based voltage D1 or the analog voltage A1 to the voltage regulator 205 based on one or more of the signal C0 received from the MIPI interface 335 and the signal C1 received from the comparator 360. For example, if the signal C0 indicates that the digital based voltage D1 should be provided to the voltage regulator (e.g., the signal C0 has a logic high state), the MUX 370 may provide the digital based voltage D1 to the voltage regulator 205. In another example, if the signal C0 indicates that the digital based voltage D1 should not be provided to the voltage regulator (e.g., the signal C0 has a logic low state), the MUX 370 may determine whether the analog voltage received from the analog voltage source 120 is greater than or equal to the threshold voltage based on the signal C1 receive from the comparator 360. If the signal C0 indicates that the digital based voltage D1 should not be provided to the voltage regulator (e.g., the signal C0 has a logic low state) and the signal C1 indicates that the analog voltage is greater than or equal to the threshold voltage (e.g., the signal C1 has a logic high state), the MUX 370 may provide the analog voltage A1 to the voltage regulator 205. If the signal C0 indicates that the digital based voltage D1 should not be provided to the voltage regulator (e.g., the signal C0 has a logic low state) and the signal C1 indicates that the analog voltage is less than the threshold voltage (e.g., the signal C1 has a logic low state), the MUX 370 may provide the digital based voltage D1 to the voltage regulator 205.

The MUX 370 may be an example of a control component (e.g., control component 105 illustrated in FIGS. 1A, 1B, and 1C). As discussed above, a control component may be one or more of a component, a circuit, a module, etc., that may determine whether a first voltage (e.g., an analog voltage) or a second voltage (e.g., a digital based voltage) should be used to by the voltage regulator 205.

FIG. 4 is a diagram illustrating an example table 400. The table 400 may illustrate the operation of the voltage selection module 100 illustrated in FIG. 3 (or of a voltage regulator if the voltage selection module 100 is included in a voltage regulator). For example, the table 400 may illustrate when the voltage selection module 100 may provide a digital based voltage D1 to a voltage regulator 205 or when the voltage selection module may provide an analog voltage A1 to the voltage regulator 205. The first column is labelled "C0" and the values in the first column may indicate different values for the signal C0 illustrated in FIG. 2. The second column is labelled "C1" and the values in the first column may indicate different values for the signal C1 illustrated in FIG. 2. The third column is labelled "OUT" and may indicate which voltage is provided to the voltage regulator. Each row of the table 400 may indicate whether a digital based voltage or an analog voltage should be provided to the voltage regulator.

As illustrated in FIG. 4, the first row of the table 400 may indicate that when the MIPI interface 335 of the digital based voltage source 125 (illustrated in FIG. 3) does not provide an indication to the voltage selection module 100 that the digital based voltage should be used (as indicated by the value "0" for C0) and when the analog voltage is less than a threshold voltage (as indicated by the value "0" for C1), the voltage selection module 100 may provide the digital based voltage D1 to the voltage regulator 205. The second row of the table 400 may indicate that when the MIPI interface 335 of the digital based voltage source 125 (illustrated in FIG. 3) does not provide an indication to the voltage selection module 100 that the digital based voltage should be used (as indicated by the value "0" for C0) and when the analog voltage is greater than or equal to the threshold voltage (as indicated by the value "1" for C1), the voltage selection module 100 may provide the analog voltage A1 to the voltage regulator 205. The third row of the table 400 may indicate that when the MIPI interface 335 of the digital based voltage source 125 (illustrated in FIG. 3) does provide an indication to the voltage selection module 100 that the digital based voltage should be used (as indicated by the value "1" for C0) and when the analog voltage is less than the threshold voltage (as indicated by the value "0" for C1), the voltage selection module 100 may provide the digital based voltage D1 to the voltage regulator 205. The fourth row of the table 400 may indicate that when the MIPI interface 335 of the digital based voltage source 125 (illustrated in FIG. 3) does provide an indication to the voltage selection module 100 that the digital based voltage should be used (as indicated by the value "1" for C0) and when the analog voltage is great than or equal to the threshold voltage (as indicated by the value "1" for C1), the voltage selection module 100 may provide the digital based voltage D1 to the voltage regulator 205.

Figure 5:
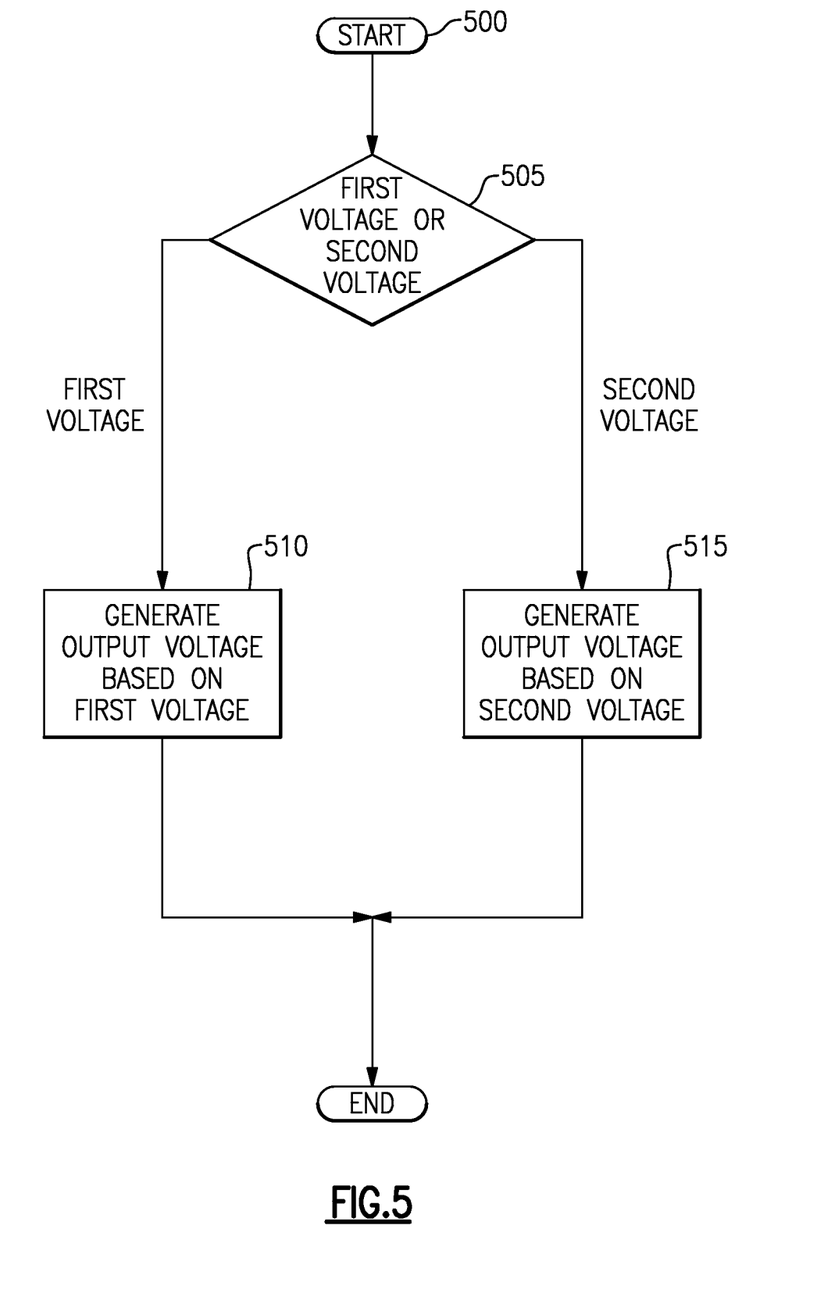
FIG. 5 is a diagram illustrating an example process for operating a voltage regulator that includes a voltage selection module having one or more features as described herein, according to one embodiment of the present disclosure.

FIG. 5 is a diagram illustrating an example process 500 for operating a voltage regulator that includes a voltage selection module having one or more features as described herein, according to one embodiment of the present disclosure. At block 505, the voltage regulator may determine whether to use a first voltage (e.g., an analog voltage received from an analog voltage source) or a second voltage (e.g., a digital based voltage received from a digital based voltage source). When the voltage regulator determines that the first voltage (e.g., the analog voltage) should be used to generate an output voltage (e.g., used to generate the regulated voltage), the voltage regulator may generate the output voltage based on (e.g., using) the first voltage at block 510. When the voltage regulator determines that the second voltage (e.g., the digital based voltage) should be used to generate an output voltage (e.g., used to generate the regulated voltage), the voltage regulator may generate the output voltage based on (e.g., using) the second voltage at block 515.

Figure 6:
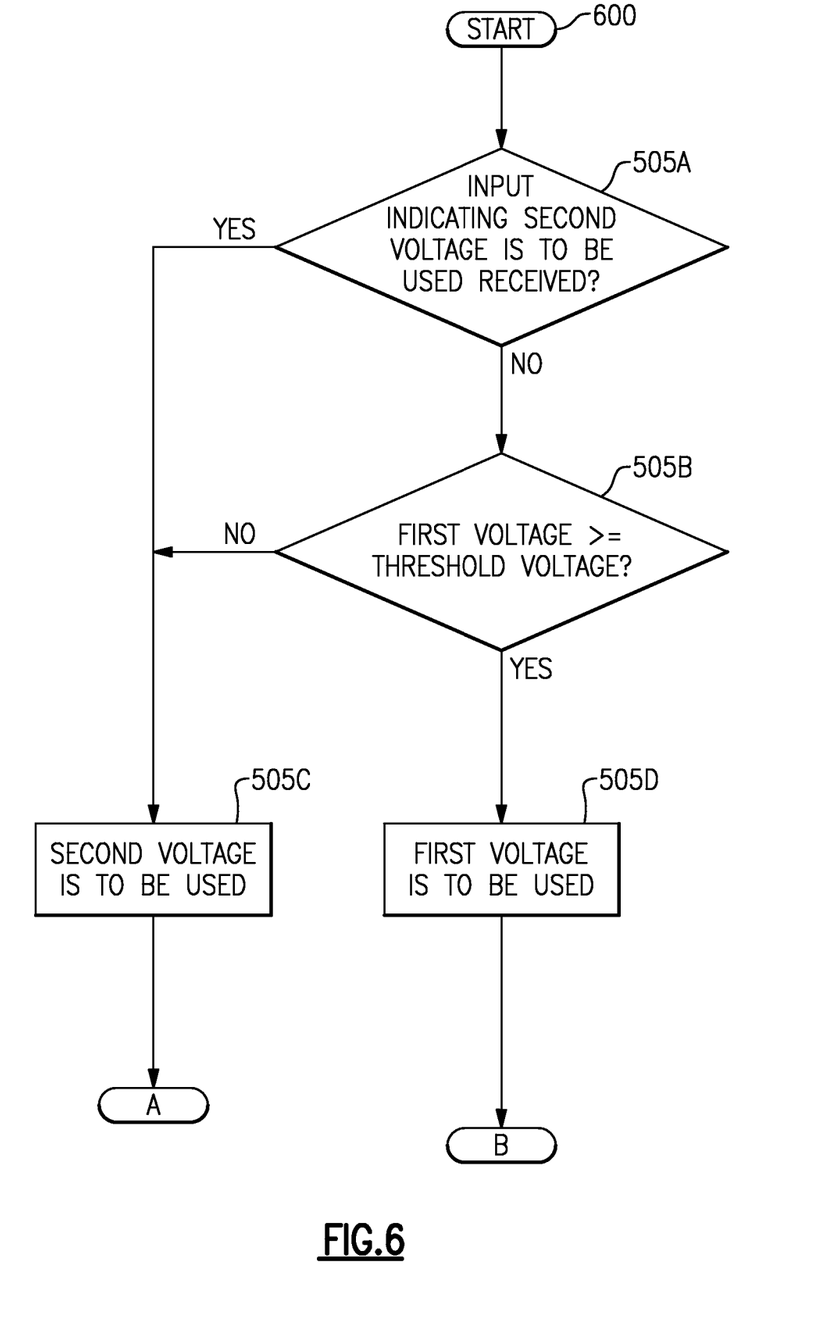
FIG. 6 is a diagram illustrating an example process for operating a voltage selection module (or a voltage regulator that includes the voltage selection module) having one or more features as described herein, according to one embodiment of the present disclosure.

FIG. 6 is a diagram illustrating an example process 600 for operating a voltage selection module (or a voltage regulator that includes the voltage selection module) having one or more features as described herein, according to one embodiment of the present disclosure. The process 600 may be used and/or performed by a voltage selection module to determine whether a first voltage (e.g., an analog voltage) or a second voltage (e.g., a digital based voltage) should be used. At block 505A, the process 600 determines whether an input indicating that a second voltage should be used is received. For example, as discussed above, the process 600 may determine whether a signal (e.g., signal C0 illustrated in FIG. 3), a message, bits of data, etc., indicating that the second voltage should be used is received. If an input indicating that the second voltage should be used is received, the voltage selection module proceeds to block 505C where the voltage selection module determines that the second voltage (e.g., the digital based voltage) is to be used.

If an input indicating that the second voltage should be used is not received, the voltage selection module proceeds to block 505B where the voltage selection module determines whether the first voltage is greater or equal to a threshold voltage. If the first voltage is greater than or equal to the threshold voltage, the voltage selection module proceeds to block 505D where the voltage selection module determines that the first voltage (e.g., the analog voltage) is to be used. If the first voltage is less than the threshold voltage, the voltage selection module proceeds to block 505C where the voltage selection module determines that the second voltage (e.g., the digital based voltage) is to be used.

As discussed above, in one embodiment, the voltage selection module may be include as part of the voltage regulator. When the voltage selection module is included as part of the voltage regulator, the voltage selection module may generate an output voltage (e.g., a regulated voltage) using the second voltage at block "A." When the voltage selection module is included as part of the voltage regulator, the voltage selection module may generate an output voltage (e.g., a regulated voltage) using the first voltage at block "B." Also as discussed above, in another embodiment, the voltage selection module may be separate from the voltage regulator (e.g., may be a separate component, circuit, module etc.). When the voltage selection module separate from the voltage regulator, the voltage selection module may provide the second voltage to the voltage regulator at block "A." When the voltage selection module separate from the voltage regulator, the voltage selection module may provide the first voltage to the voltage regulator at block "B."

Figure 7:
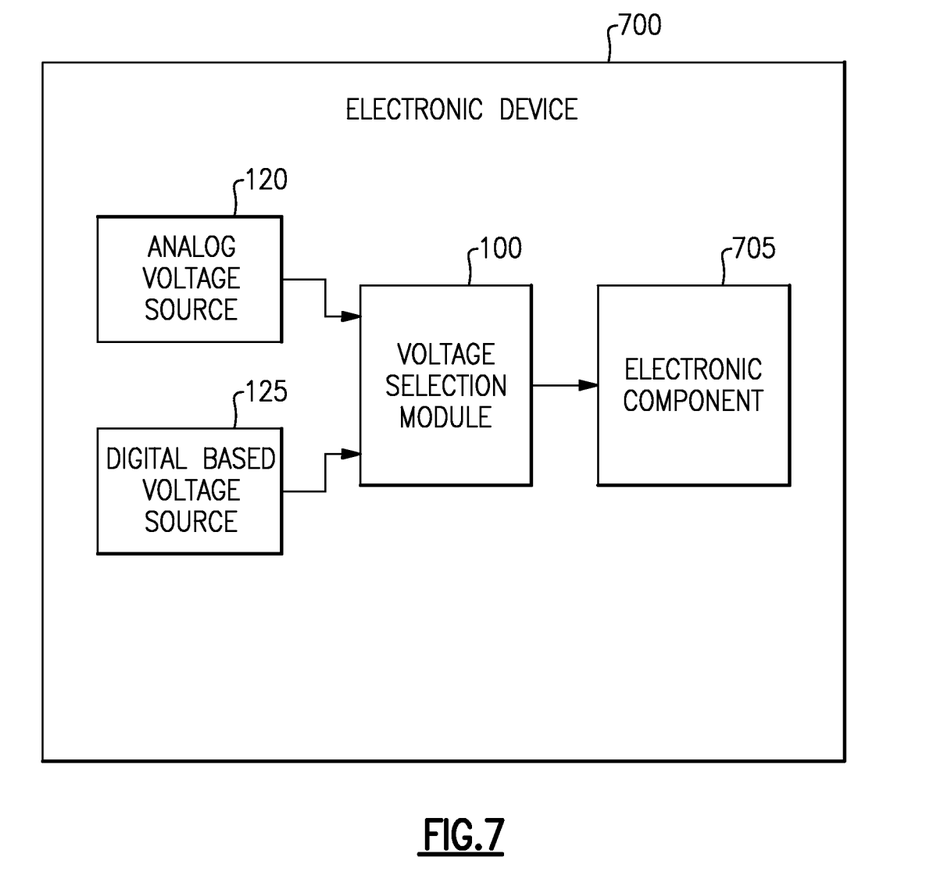
FIG. 7 is a block diagram illustrating an example electronic device, according to one embodiment of the present disclosure.

FIG. 7 is a block diagram illustrating an example electronic device 700 according to one embodiment of the present disclosure. Examples of electronic devices may include, but are not limited to, a cellular phone, a smartphone, a hand-held wireless device with or without phone functionality, a tablet, a laptop computer, a desktop computer, a personal digital assistant (PDA), a network computer, a wireless device, etc. The electronic device 700 includes an analog voltage source 120, a digital-based voltage source 125, a voltage selection module 100, and an electronic component 705.

The electronic component 705 may be any combination of devices, components, circuits, and/or other hardware that may use power (e.g., a voltage) received from the analog voltage source 120 and/or digital-based voltage source 125. Examples of electronic components may include, but are not limited to, memory (e.g., random access memory (RAM), flash memory, etc.), circuits or components that may process audio, power amplifiers (PAs), image sensors (e.g., charge-coupled devices (CCDs) and/or complementary metal-oxide semiconductor (CMOS) devices), etc.

As discussed above, the voltage selection module 100 may determine whether to provide the digital based voltage or the analog voltage to electronic component 705. For example, the voltage selection module 100 may receive may receive an indication (e.g., a signal, a message, bits of data, etc.) from a digital based voltage component (e.g., MIPI interface 335 illustrated in FIG. 3) indicating that the voltage selection module 100 should provide the digital based voltage to the electronic component 705. In another example, the voltage selection module 100 may not receive an indication from the digital based voltage component indicating that the voltage selection module 100 should provide the digital based voltage to the electronic component 705. The voltage selection module 100 may determine whether the analog voltage received from analog voltage source 120 is greater than or equal to a threshold voltage. If the analog voltage is less than the threshold voltage, the voltage selection module 100 may provide the digital based voltage to the electronic component 705 based on the signal, message, bits of data, etc. If the analog voltage is greater than or equal to the threshold voltage, the voltage selection module 100 may provide the analog voltage to the electronic component 705. Also as discussed above, the voltage selection module 100 may be included as part of the electronic component 705.

Figure 8:
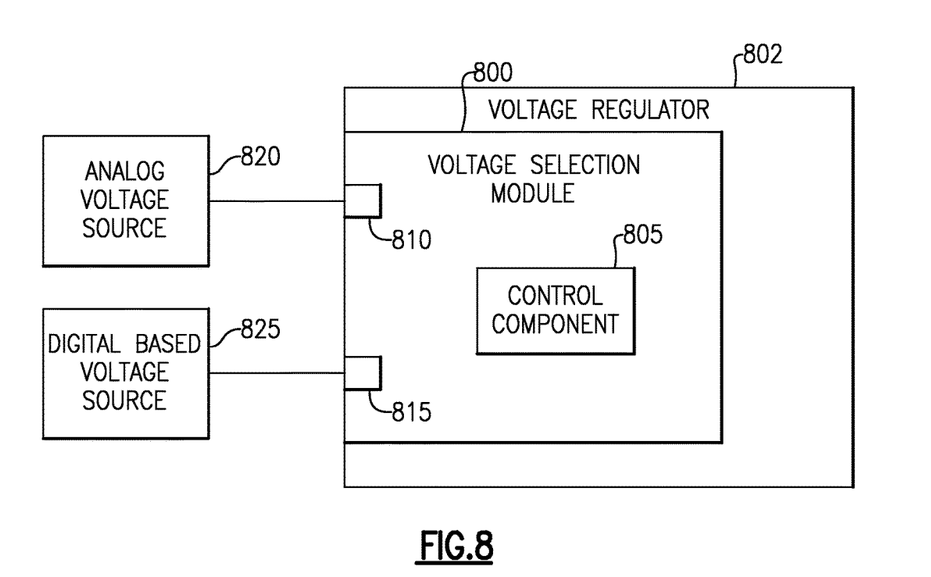
FIG. 8 is a block diagram illustrating a voltage regulator, according to one embodiment of the present disclosure.

FIG. 8 is a block diagram illustrating a voltage regulator 802 according to one embodiment of the present disclosure. The voltage regulator 802 is coupled to an analog voltage source 820 and a digital based voltage source 825. The voltage regulator 802 includes a voltage selection module 800. The voltage selection module 800 includes a control component 805.

In one embodiment, the control component 805 may determine whether a digital based voltage (received from the digital based voltage source 825) or the analog voltage (received from the analog voltage source) should be used by the voltage regulator 802 to generate an output voltage. For example, the control component 805 may receive may receive an indication (e.g., a signal, a message, bits of data, etc.) from a digital based voltage component (e.g., MIPI interface 335 illustrated in FIG. 3) indicating that the voltage selection module 800 should provide the digital based voltage to the voltage regulator 802. In another example, the control component 805 may not receive an indication from the digital based voltage component and the control component 805 may determine whether the analog voltage received from analog voltage source 820 is greater than or equal to a threshold voltage. If the analog voltage is less than the threshold voltage, the control component 805 may determine that the voltage regulator 802 should use the digital based voltage. If the analog voltage is greater than or equal to the threshold voltage, the control component 805 may determine that the voltage regulator 802 should use the analog voltage.

Figure 9:
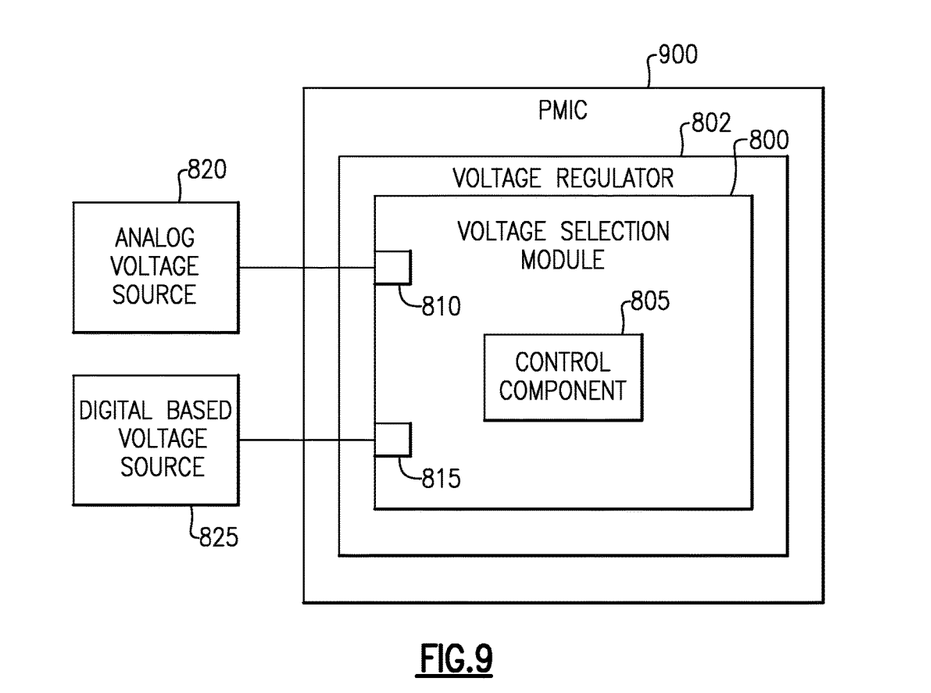
FIG. 9 is a block diagram illustrating an example voltage regulator, according to one embodiment of the present disclosure.

FIG. 9 is a block diagram illustrating an example voltage regulator 802, according to one embodiment of the present disclosure. The voltage regulator 802 may be included as part of an integrated circuit (IC) device or system such as a power management integrated circuit (PMIC) 900. The voltage regulator 802 is coupled to an analog voltage source 820 and a digital based voltage source 825. The voltage regulator 802 is shown to include a control component 805 having one or more features as described herein.

In some embodiments, the PMIC 900 of FIG. 8 may be implemented on a single chip, and may include one or more voltage regulators and one or more linear regulators. In some embodiments, such a PMIC may be configured to be used in devices including, for example, wireless devices such as cellular phones, or any devices that utilize voltage regulators. In other embodiments, the voltage regulator 802 may be implemented as a standalone discrete device (e.g., may be separate from the PMIC 900).

In some implementations, a device and/or a circuit having one or more features described herein may be included in an RF device such as a wireless device. Such a device and/or a circuit may be implemented directly in the wireless device, in a modular form as described herein, or in some combination thereof. In some embodiments, such a wireless device may include, for example, a cellular phone, a smart-phone, a hand-held wireless device with or without phone functionality, a wireless tablet, etc.

Figure 10:
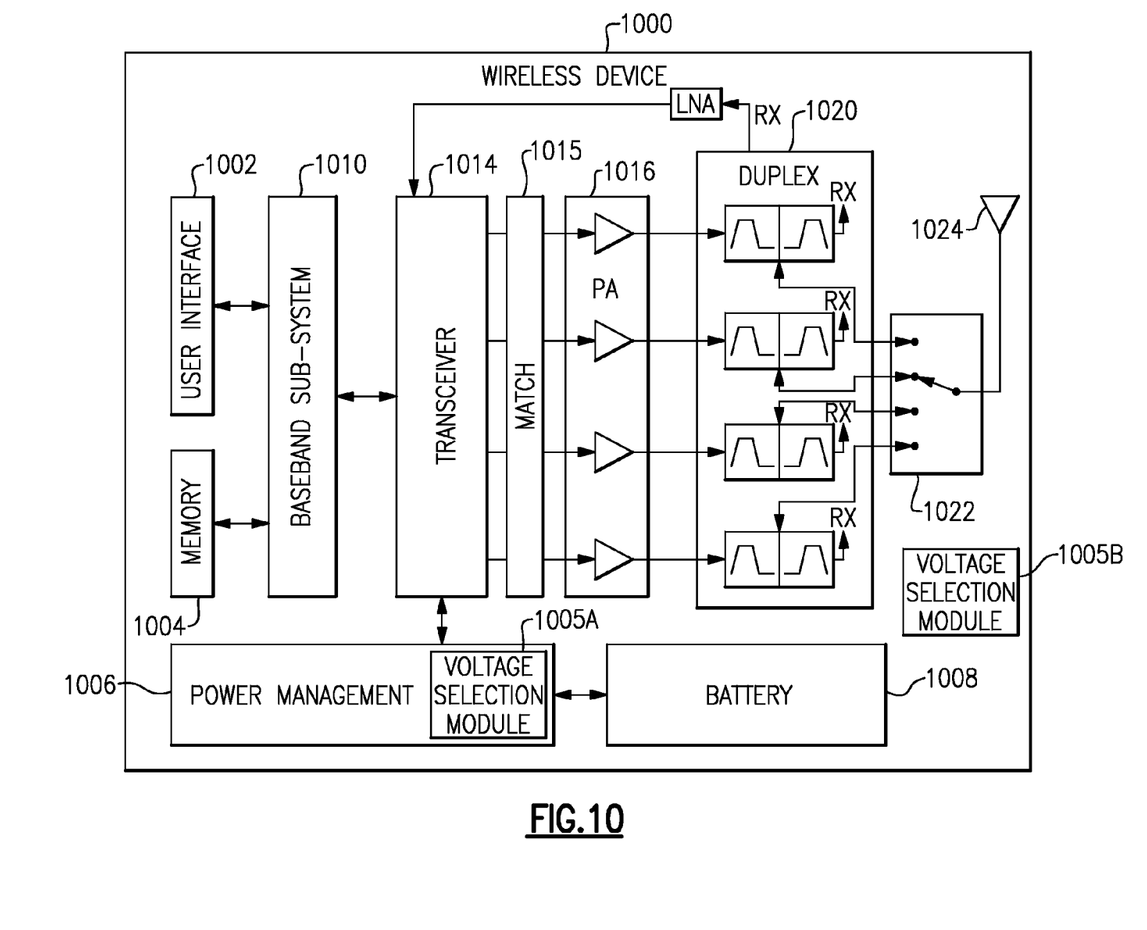
FIG. 10 depicts an example wireless device having one or more advantageous features described herein.

FIG. 10 depicts an example wireless device 1000 having one or more advantageous features described herein. In some embodiments, a transceiver 1014 may be configured and operated to generate RF signals to be amplified and transmitted, and to process received signals. One or more power amplifiers (PAs) 1016 may receive their respective RF signals from the transceiver 1014 and amplify such RF signals for transmission. The amplified outputs of the PAs 1016 are shown to be matched (via one or more matching circuits 1015) and routed to an antenna 1024 via their respective duplexer(s) 1020 and an antenna switch module (ASM) 1022.

In some embodiments, the duplexer(s) 1020 may allow transmit and receive operations to be performed simultaneously using a common antenna (e.g., 1024). As illustrated in FIG. 10, received signals are shown to be routed to one or more "RX" paths that may include, for example, one or more low-noise amplifiers (LNAs) 1017. Received signals amplified by the LNA(s) 1017 are shown to be routed to the transceiver 1014 for further processing.

In FIG. 10, the transceiver 1014 is shown to interact with a baseband sub-system 1010 that is configured to provide conversion between data and/or voice signals suitable for a user and RF signals suitable for the transceiver 1014. The transceiver 1014 is also shown to be connected to a power management component 506 that is configured to manage power for the operation of the wireless device.

The baseband sub-system 1010 is shown to be connected to a user interface 1002 to facilitate various input and output of voice and/or data provided to and received from the user. The baseband sub-system 1010 may also be connected to a memory 1004 that is configured to store data and/or instructions to facilitate the operation of the wireless device, and/or to provide storage of information for the user.

In the example of FIG. 10, the power management component 1006 may be implemented as a PMIC that includes a voltage selection module 1005A having one or more features as described herein. In some embodiments, a voltage selection module 1005B having one or more features as described herein may also be implemented as a standalone device outside of the PMIC.

A number of other wireless device configurations may utilize one or more features described herein. For example, a wireless device does not need to be a multi-band device. In another example, a wireless device may include additional antennas such as diversity antenna, and additional connectivity features such as Wi-Fi, Bluetooth, and GPS.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts may be performed as a single step and/or phase. Also, certain steps and/or phases may be broken into additional sub-components to be performed separately. In some instances, the order of the steps and/or phases may be rearranged and certain steps and/or phases may be omitted entirely. Also, the methods described herein are to be understood to be open-ended, such that additional steps and/or phases to those shown and described herein may also be performed.

Some aspects of the systems and methods described herein may advantageously be implemented using, for example, computer software, hardware, firmware, or any combination of computer software, hardware, and firmware. Computer software may include computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that may be implemented using software to be executed on a general purpose computer may also be implemented using a different combination of hardware, software, or firmware. For example, such a module may be implemented completely in hardware using a combination of integrated circuits. Alternatively or additionally, such a feature or function may be implemented completely or partially using specialized computers designed to perform the particular functions described herein rather than by general purpose computers.

Multiple distributed computing devices may be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that may direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "include," "including," "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations. Furthermore, the terms "first," "second," "third," "fourth," etc., as used herein are meant as labels to distinguish among different elements and may not necessarily have an ordinal meaning according to their numerical designation.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein may be applied to other methods and systems, and are not limited to the methods and systems described above, and elements and acts of the various embodiments described above may be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A voltage selection module comprising:
an analog voltage input coupled to an analog voltage source;
a digital based voltage input coupled to a digital based voltage source, the digital based voltage source including a Mobile Industry Processor Interface (MIPI) interface and a digital-to-analog converter (DAC) coupled to the MIPI interface, the MIPI interface configured to provide a digital signal to the DAC; and a control component coupled to the analog voltage input and the digital based voltage input, the control component configured to select a first voltage from the analog voltage input or a second voltage from the digital based voltage input based on a determination of whether to use the first voltage or the second voltage to provide a reference voltage to a voltage regulator coupled to the control component, the control component further configured to provide the reference voltage to the voltage regulator.

2. The voltage selection module of claim 1 wherein the control component is further configured to determine that the first voltage is to be used to provide the reference voltage.

3. The voltage selection module of claim 2 wherein the control component is configured to determine that the first voltage is to be used to provide the reference voltage by receiving a first input indicating that the first voltage is to be used.

4. The voltage selection module of claim 3 wherein the control component is further configured to determine that the first voltage is to be used to provide the reference voltage by determining that the first voltage is greater than a threshold voltage.

5. The voltage selection module of claim 4 wherein the control component is further configured to determine that the first voltage is to be used to provide the reference voltage by receiving a second input indicating that the second voltage is not to be used.

6. The voltage selection module of claim 2 wherein the control component is further configured to provide the reference voltage based on the first voltage.

7. The voltage selection module of claim 1 wherein the control component is further configured to determine that the second voltage is to be used to provide the reference voltage.

8. The voltage selection module of claim 7 wherein the control component is configured to determine that the second voltage is to be used to provide the reference voltage by receiving a first input indicating that the second voltage is to be used.

9. The voltage selection module of claim 7 wherein the control component is configured to determine that the second voltage is to be used to provide the reference voltage by determining that the first voltage is less than a threshold voltage.

10. The voltage selection module of claim 7 wherein the control component is further configured to provide the reference voltage based on the second voltage.

11. The voltage selection module of claim 1 wherein the control component comprises a comparator coupled to the analog voltage input.

12. The voltage selection module of claim 11 wherein the control component further comprises a multiplexer (MUX) coupled to the comparator.

13. The voltage selection module of claim 12 wherein the MUX is further coupled to the MIPI interface of the digital based voltage source, the analog voltage input, and the digital based voltage input.

14. An electronic device comprising:
a voltage regulator; and
a voltage selection module coupled to the voltage regulator, the voltage selection module including an analog voltage input coupled to an analog voltage source, a digital based voltage input coupled to a digital based voltage source, the digital based voltage source including a Mobile Industry Processor Interface (MIPI) interface and a digital-to-analog converter (DAC) coupled to the MIPI interface, the MIPI interface configured to provide a digital signal to the DAC, and a control component coupled to the analog voltage input and the digital based voltage input, the control component configured to select a first voltage received from the analog voltage input or a second voltage received from the digital based voltage input based on a determination of whether to use the first voltage or the second voltage to provide a reference voltage to the voltage regulator, the control component further configured to provide the reference voltage to the voltage regulator.

15. A method for selecting a voltage, the method comprising:
selecting a first voltage received from an analog voltage input coupled to an analog voltage source or a second voltage received from a digital based voltage input coupled to a digital based voltage source based on a determination of whether to use the first voltage or the second voltage to provide a reference voltage to a voltage regulator, the digital based voltage source including a Mobile Industry Processor Interface (MIPI) interface and a digital-to-analog converter (DAC) coupled to the MIPI interface, the MIPI interface configured to provide a digital signal to the DAC;
providing the reference voltage to the voltage regulator based on the first voltage in response to a first determination that the first voltage is to be used; and
providing the reference voltage to the voltage regulator based on the second voltage in response to a second determination that the second voltage is to be used.

16. The method of claim 15 wherein the first determination is based on a first input indicating that the first voltage is to be used.

17. The method of claim 16 wherein the first determination is further based on a third determination that the first voltage is greater than a threshold voltage.

18. The method of claim 17 wherein the first determination is further based on a second input indicating that the second voltage is not to be used.

19. The method of claim 15 wherein the second determination is based on a first input indicating that the second voltage is to be used.

20. The method of claim 15 wherein the second determination is based on a third determination that the first voltage is less than a threshold voltage.

* * * * *